United States Patent
Hook et al.

[15] 3,694,769
[45] Sept. 26, 1972

[54] LOW-LOSS LASER Q-SWITCH

[72] Inventors: William R. Hook, Los Angeles; Ronald P. Hilberg, Redondo Beach; Roland H. Dishington, Pacific Palisades, all of Calif.

[73] Assignee: TRW, Inc., Redondo Beach, Calif.

[22] Filed: May 17, 1971

[21] Appl. No.: 143,906

[52] U.S. Cl. .......................... 331/94.5, 350/160 R
[51] Int. Cl. .................................. H01s 3/11
[58] Field of Search ............... 331/94.5; 350/160

[56] References Cited

UNITED STATES PATENTS

| | | | |
|---|---|---|---|
| 3,508,164 | 4/1970 | Uchida | 331/94.5 |
| 3,564,450 | 2/1971 | Immarco et al. | 331/94.5 |
| 3,577,097 | 5/1971 | Hilberg | 331/94.5 |

Primary Examiner—William L. Sikes
Attorney—Daniel T. Anderson, Edwin A. Oser and Jerry A. Dinardo

[57] ABSTRACT

A high-power Q-switched laser is provided having a low loss. One common type of Q-switched laser conventionally includes an electro-optical element for altering the polarization of the light wave in the cavity of the laser. Preferably, the element is a Pockels cell. A voltage applied to the cell is changed suddenly to increase the Q of the cavity thereby to permit the laser to lase. It has been found that the crystal of the Pockels cell suffers a birefringent effect due to the mechanical strain caused by the applied voltage. This is counteracted by a compensating voltage applied to the cell so that the loss of the laser defined as the ratio of light power deflected out of the cavity to the light power approaching the light polarizer in the cavity becomes substantially zero at a time when the laser lases. The voltage which must be applied to a Pockels cell containing lithium niobate is positive while a negative voltage is required for a crystal of potassium dideuterium phosphate.

4 Claims, 5 Drawing Figures

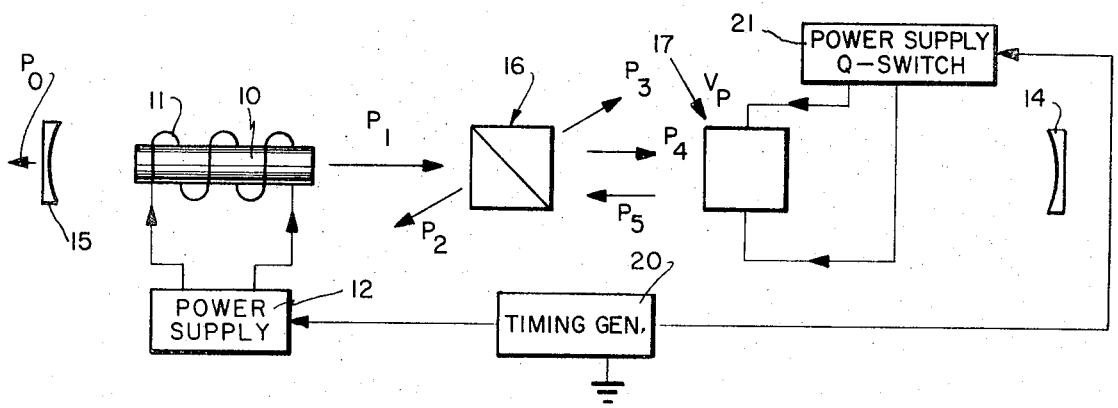
Fig.1
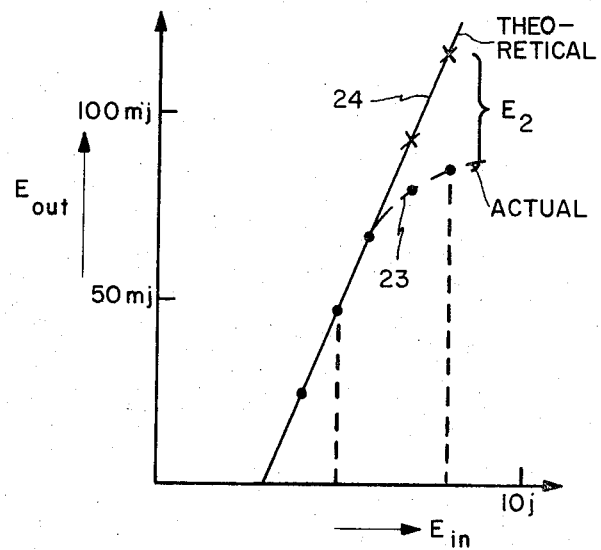
Fig.2
Fig.3
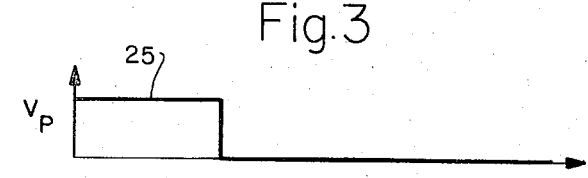
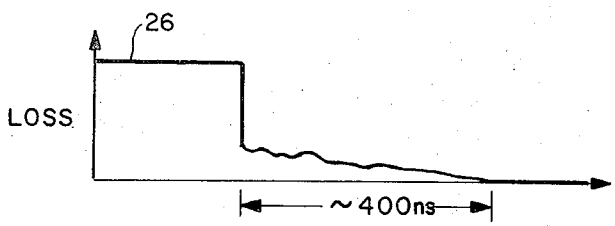
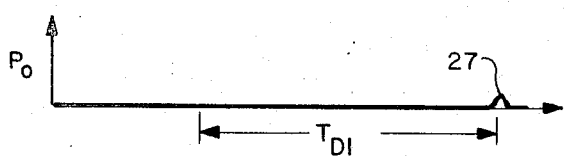
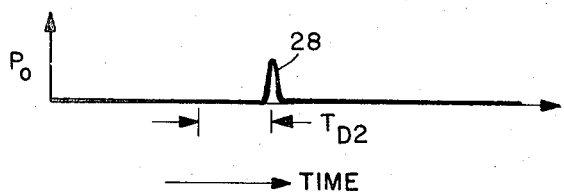
William R. Hook
Ronald P. Hilberg
Roland H. Dishington
INVENTORS William R. Hook
Ronald P. Hilberg
Roland H. Dishington
INVENTORS

LOW-LOSS LASER Q-SWITCH

BACKGROUND OF THE INVENTION

A Q-switched laser includes a laserable material and means for pumping it. The laserable material is enclosed in an optical cavity in which is also disposed a light polarizer and an electro-optical element capable of altering the polarization of a light wave. This element may, for example, consist of a Pockels cell which includes a crystal of certain electro-optically active materials. Among these materials are: potassium dihydrogen phosphate usually referred to as KDP and having the formula $KH_2PO_4$. Frequently, instead of using KDP its deuterated form is used which is often referred to as KD*P. This has the formula $KD_2PO_4$. Alternatively, it is feasible to use a crystal of lithium niobate having the formula $LiNbO_4$. In general KD*P has an advantage over KDP in that it requires less voltage to switch the crystal to alter the polarization of light by a predetermined amount. On the other hand, lithium niobate has the advantage that the electric field may be applied to the crystal in a direction at right angles to the direction travel of the light. With either KDP or KD*P it is necessary to apply the electric field in the direction in which the light passes through the crystal.

The action of such a Q-switched laser is quite well known in the art. However, to summarize briefly, the Pockels cell is energized by an applied voltage so as to alter the polarization of the light in such a manner that the Q of the cavity becomes rather low. In other words this means that the polarization of the light is such that the light wave is not reflected back by the two end mirrors forming the cavity but rather is deflected out of the cavity by the light polarizer. When it is now desired to cause the laser to lase the voltage of the Pockels cell is suddenly switched thereby to raise the Q of the cavity. As a result the light contained in the laser cavity is made to reflect from the two end mirrors of the cavity so that the light intensity is permitted to build up by the usual lasting action.

However, it has been found experimentally by the applicants that the light output energy when plotted as a function of the input energy deviates from the theoretical linear relationship. Thus, it may be said that the output energy of the laser rolls off at energy levels above a certain point.

In accordance with the present invention it has been discovered that this energy loss may be substantially eliminated by applying a suitable compensating voltage to the Pockels cell forming part of the Q switch of the laser. The experimental work on which the present invention is based has been described by two of the applicants of the present application (Hilberg and Hook) in a paper which appears in the August 1970 issue of Applied Optics, Volume 9, pages 1,939 through 1,940.

It is accordingly an object of the present invention to provide a low-loss, high-power, Q-switched laser of the type including an electro-optical element capable of altering the polarization of a light wave.

Another object of the invention is to provide a Pockels cell for a high-power, Q-switched laser cavity which is so biased by an applied voltage as to minimize the losses caused by the initial application of the high voltage to the Pockels cell.

A further object of the present invention is to minimize or eliminate the problem caused by undesired double pulsing of a Q-switched laser by converting the excitation energy of substantially all of the excited laser atoms into photons during the emission of the desired Q-switched pulse.

SUMMARY OF THE INVENTION

Thus the invention relates to a high-power, Q-switched laser. Such a laser includes a laserable material which may, for example, be a solid state material and a pump for pumping the laserable material. An optical cavity encloses the laserable material in which is disposed a light polarizer. In accordance with the present invention there is provided an electro-optical element capable of altering the polarization of a light wave in accordance with an applied voltage. Such an element may be a Pockels cell and is disposed in the optical cavity. A Pockels cell, that is the crystal of the cell, suffers a birefringent effect due to the mechanical strain caused by the applied voltage. In order to obviate the effects of this birefringent effect a voltage is initially applied to the Pockels cell to alter the polarization of the light passing through the cavity to lower the Q thereof. Then the voltage is suddenly changed to such a value that the loss defined as the ratio of the light power deflected out of the cavity to the light power approaching the light polarizer becomes substantially zero at the time the laser lases. This time is dependent upon the output light level or the laser power. This makes it possible to substantially compensate the birefringent effect.

Thus if the Pockels cell consists of lithium niobate, a compensating direct-current positive voltage should be applied, for example, to the normally grounded electrode of the cell. On the other hand, if the Pockels cell consists of potassium dideuterium phosphate a compensating direct-current negative voltage should be applied to the normally grounded electrode of the cell.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

BRIEF DESCRIPTION OF THE DRAWINGS

FIG. 1 is a schematic representation of a laser cavity in accordance with the present invention and a block diagram of the power supply for the laser pump and the Pockels cell as well as the Q-switch;

FIG. 2 is a graph plotting the energy developed by the laser as a function of the energy applied to the laser;

FIG. 3 is a set of curves plotted as a function of time to explain the operation of a conventional laser without the compensation in accordance with the present invention;

DESCRIPTION OF THE PREFERRED EMBODIMENT

Figure 4:
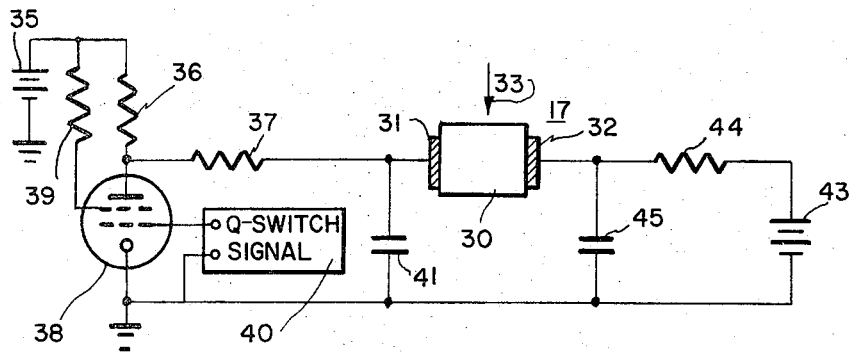
FIG. 4 is a schematic diagram including a circuit diagram illustrating the voltages applied to a Pockels cell in accordance with the present invention.

Referring now to FIG. 1 there is illustrated a conventional Q-switched laser. The laser includes a laserable material 10 such as a solid state rod. This may be any laserable material capable of being pulsed. For high-power operation it is preferred to use neodymium which may either be embedded in glass or in YAG, that is an yttrium-aluminum garnet. The glass or YAG serves as a host in which the neodymium is embedded. The laser rod 10 may be provided with a suitable flash lamp 11 for pumping the laserable material to an upper or excited state. The flash lamp 11 may be powered by a power supply 12.

The laser is disposed in an optical cavity formed by a pair of mirrors 14 and 15. Both mirrors 14 and 15 are preferably front surface mirrors, that is, they are coated on their opposed surfaces. Preferably, the two mirrors 14 and 15 are of spherical shape as shown although they may have plane surfaces. In general, it has been found that mirrors with spherical surfaces provide an optical cavity which is more readily adjustable. The mirrors may be coated with suitable dielectric layers. One of the mirrors, that is mirror 14, is made substantially completely reflective. Its reflectivity may be on the order of 99 percent. The other mirror 15 is made only partially reflective and may have a reflectivity on the order of 50 percent to transmit a light beam shown as $P_o$.

In order to provide Q-switching, there are disposed two components in the optical cavity defined by the mirrors 14 and 15. These two components include a light polarizer 16 and an electro-optical element 17 capable of altering the polarization of a light wave in accordance with an applied voltage. The polarizer 16 may, for example, consist of a calcite prism or any other conventional component for polarizing an incident light wave such as shown in $P_1$ and for directing it out of the cavity in the direction of the arrow $P_3$ unless the polarization of the light wave is in a predetermined direction so that the light passes through the polarizer 16 in the direction of arrow $P_4$. Similarly the polarizer 16 will polarize light traveling in the opposite direction of arrow $P_5$ and will direct it out of the cavity in the direction of arrow $P_2$ unless the polarization of the incident light wave $P_5$ is the same as that of the transmitted light $P_4$.

The electro-optical element 17 preferably consists of a Pockels cell. The active crystal of such a Pockels cell may consist of KDP, or preferably of KD*P, or alternatively of lithium niobate. In any case, the cell has the property of altering the polarization of an incident light wave in accordance with an applied voltage. This is due to a differential retardation of the ordinary and extraordinary light rays passing through the crystal due to an applied voltage.

In order to time the power supply 12 there may be provided a timing generator 20 which initiates pumping of the laser rod 10 by the flash lamp 11. After a predetermined time interval, the timing generator 20 may then cause the power supply and Q-switch 21 to operate by suddenly varying the voltage applied to the electrodes of the Pockels cell 17. Conventionally this is effected by applying a high voltage to the Pockels cell which is then suddenly reduced to zero when it is desired to raise the Q of the cavity for the purpose of causing the laser to lase.

When such a laser is operated in a conventional manner it has been found that the output power $E_{out}$ plotted as a function of the applied input power $E_{in}$ deviates from the straight line relationship shown by curve 24 in FIG. 2. The actual measured curve is represented by the line 23. In FIG. 2 the energy input and energy output is represented by j (joule) and mj (millijoule). Thus there is a considerable loss in energy represented in FIG. 2 by $E_2$ between the theoretical output power and the actually measured output power. The measured curve 23 droops or rolls off at the higher power levels. This rolloff loss is particularly severe with a Pockels cell using lithium niobate. However, it has been found that it also occurs with a modulator or Pockels cell having a KD*P crystal.

Referring now to FIG. 3 a curve 25 shows the voltage $V_P$ applied to the Pockels cell 17 as a function of time. As shown here the high voltage is suddenly reduced to zero to cause the laser to lase. Curve 26 of FIG. 3 shows the switching loss which is defined as the ratio of the power deflected out of the cavity to the power approaching the Q switch, that is, the polarizer 16. Thus this loss is represented by the ratio of $P_2$ over $P_1$ (See FIG. 1). This loss should be high so as to lower the Q of the cavity until it is desired to cause the laser to lase. At that time the loss should be negligible. However, curve 26 clearly shows that the loss drops to about 25 percent and eventually decays to zero in a time period of approximately 400 nanoseconds (nsec).

At low input energy levels there is a long time delay indicated by curve 27 at $T_{D1}$ between the switching time and the time the output light pulse 27 actually appears. Accordingly, there is negligible loss in efficiency. However, if the input energy level is high, the time delay $T_{D2}$ becomes shorter as shown by curve 28 indicating the output light pulse. Therefore, the laser suffers a considerable output loss due to the switching loss. The reason that the time delay is variable is due to the fact that the gain of the laser is variable with energy. Thus at higher energy levels there are more excited atoms in the laserable material 10 and hence the overall gain is higher and the laser tends to lase sooner.

As described in more detail in the paper by Hilberg and Hook above referred to, experiments have been carried out to discover the cause of the loss represented by curve 23 of FIG. 2. These experiments have shown that substantially the entire loss is accounted for by light which leaves the polarizer 16 in the direction of arrow $P_2$. This indicates that after the Pockels cell 17 was switched it continued to change or alter the polarization of the light sufficiently so that not all the light was enabled to pass through the polarizer 16. Accordingly, it is believed at this time that the loss is due to a residual birefringence effect which might be called a strain birefringence effect. It is presently believed that the voltage $V_p$ applied to the crystal of the Pockels cell 17 causes a piezoelectric action whereby the crystal is physically compressed. After this voltage is removed, as shown by curve 25 of FIG. 3, the crystal remains compressed for a definite interval of time which may, for example, be in the order of 400 nanoseconds as shown by curve 26. This compression causes mechanical strain which in turn causes the birefringent effect.

This loss may also be termed an elastooptic loss because it is the result of a mechanical compression of the crystal. The curves which were obtained experimentally and which are shown in the paper above referred to, indicate that an acoustic oscillation or ringing of the crystal occurs. The function shown as curve 26, FIG. 3, is the first half-cycle of this oscillation.

Having thus ascertained experimentally the cause for the loss of efficiency it has then been found in accordance with the present invention, that this loss may be counteracted or compensated by applying a suitable bias voltage to the crystal of the Pockels cell. Such an arrangement is shown in FIG. 4 to which reference is now made. In FIG. 4 the Pockels cell 17 is seen to consist of a crystal 30 with electrodes 31 and 32. The arrow 33 in FIG. 4 indicates the direction of the light passing through the crystal. This is true for a lithium niobate crystal where the direction of the electric field extends in a direction perpendicular to the direction of the optic axis of the crystal. The optic axis of the crystal is defined as the axis where the velocity of a light ray does not depend on the polarization of the light. Such a crystal is uniaxially birefringent.

However, in the case of KDP or KD*P the direction of the optic axis is parallel to the direction of the electric field. In this case the light must pass through the crystal in the direction of the applied electric field so that the electrodes may consist of suitable rings of a conductive material. This applies both to KDP and deuterated KDP. In other words both of these crystals are uniaxially birefringent in the absence of an applied electric field.

Conventionally the electrode 31 is supplied with a direct-current potential, for example, from a suitable battery 35 having its negative terminal grounded while its positive terminal is connected through resistors 36 and 37 to the electrode 31. A suitable fast-switching tube 38 which may be a cold-cathode tube has its anode connected to the junction point between the resistors 36 and 37 while its cathode is grounded. Its control grid is connected to a Q-switched signal source 40 while the keep alive grid is returned to the positive voltage provided by battery 35 through a resistor 39. The Q-switched signal source 40 applies a suitable triggering signal to the tube 38 which should be a very fast acting tube capable of carrying high current so as to discharge as quickly as possible the potential stored across the storage capacitor 41 disposed between electrode 31 and ground. For the switching tube 38 a tube type KN-6 krytron may be used.

Thus, normally the battery 35 through resistors 36 and 37 in series charges the capacitor 41 to the battery voltage which is accordingly also applied to electrode 31. When it is desired to Q switch the laser, a signal is applied to the control grid of tube 38 causing the tube to conduct and to discharge the capacitor 41 substantially instantaneously through the low-resistance, current-limiting resistor 37.

In normal operation, the electrode 32 is grounded. However, in accordance with the present invention, this electrode is also supplied with a direct-current bias voltage through a battery 43 having one of its terminals grounded while the other terminal is connected to the electrode 32 through a resistor 44. A capacitor 45 stores the voltage applied to the electrode 32 and tends to maintain it at a steady value.

By way of example, the battery 35 may provide a voltage of 3,400 volts and the battery 43 may provide a voltage of 1,000 volts. The capacitor 41 may have a capacitance of 200 picofarad and the capacitor 45 may have a capacitance of 2,000 picofarad. The resistor 36 and 44 may each have a resistance of 10,000,000 ohms and resistor 37 may have a resistance of 12 ohms.

Figure 5:
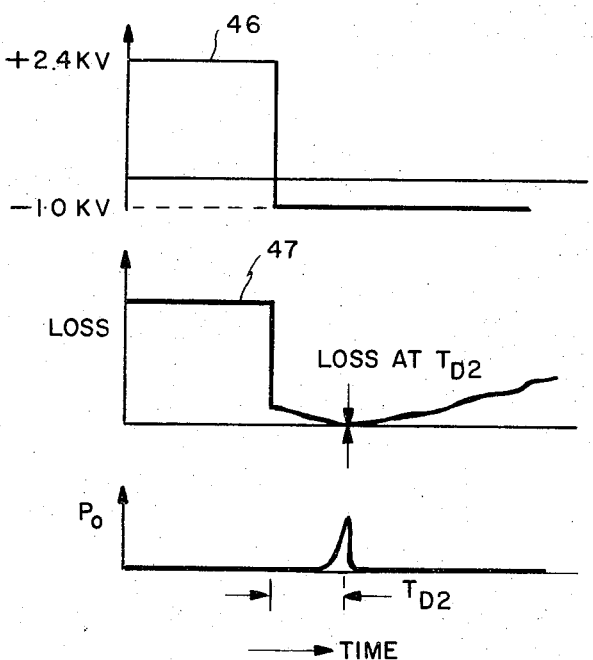
FIG. 5 is a series of curves plotted as a function of time, similar to the curves of FIG. 3 and illustrating the applied voltages and losses obtained with a laser in accordance with the present invention.

Referring now to FIG. 5 there are shown various wave shapes for the Q switch of FIG. 4 embodied in the circuit or system of FIG. 1. Thus, curve 46 indicates the net voltage applied across the Pockels cell 17. In the case of a lithium-niobate crystal the net voltage across the crystal is maintained at a steady level of 2,400 volts until the tube 38 is made to conduct. Thereupon the voltage of electrode 31 becomes substantially zero while a voltage of +1,000 volts is still applied to the electrode 32. Thus the net voltage across the crystal is changed to −1,000 volts. However, it should be understood that if the crystal 30 consists of KD*P the voltage applied to electrode 32 should be a positive voltage rather than a negative voltage.

As pointed out before, the magnitude of the voltage supplied by battery 43 should be determined experimentally for each desired output level of the laser. In any case, the voltage should be such as to obtain a curve of the type shown in FIG. 5 at 47. This shows that the loss at a time $T_{D2}$ should be minimized or made to vanish. This time interval $T_{D2}$ corresponds to the time when the output light pulse actually appears after the tube 38 has been switched or the voltage applied to electrode 31 has been made to vanish. This time interval may, for example, amount to 120 nanoseconds in the case of a neodymium in YAG laser.

It should be noted that by applying a bias voltage in accordance with the invention the theoretical curve 24 FIG. 2 has been experimentally obtained. The observed values are shown by the crosses of curve 24. Of course, for each measured value the bias voltage had to be adjusted in accordance with the input energy level so that the switch loss is always a minimum for the particular laser buildup time $T_{D2}$ as shown in FIG. 5.

There has thus been disclosed a high-power Q-switched laser where losses due to a strain birefringent effect are minimized. Such losses have been found experimentally for Pockels cells using either lithium niobate or KD*P crystals. The loss can be substantially eliminated by applying a suitable bias voltage to the crystal. This bias voltage can be determined experimentally by causing the loss to vanish in accordance with the desired output light level.

What is claimed is:

1. A high-power, low-loss, Q-switched laser comprising:
    a. a laserable material;
    b. means for pumping said laserable material;
    c. an optical cavity defining an optical axis and enclosing said laserable material;
    d. a light polarizer disposed in said cavity and along said optical axis, said polarizer passing light radiation having a first polarization direction and coming from one direction, and deflecting out of the cavity radiation having a second polarization direction, and said polarizer passing radiation having said first polarization direction coming from the opposite direction, and deflecting out of said cavity radiation having said second polarization direction;

e. a Pockels cell disposed in said optical cavity and along sad optical axis for altering the polarization of the radiation from said second polarization direction to said first polarization direction in accordance with an applied voltage, said Pockels cell suffering a strain-birefringent effect caused by the applied voltage;

f. first means for initially applying a first voltage to said cell to alter the polarization of the light to said second polarization direction, thereby to lower the Q of said cavity;

g. second means for suddenly changing said first voltage applied to said cell to alter the polarization of the light to said first polarization direction, thereby to suddenly raise the Q of said cavity; and h. third means for applying a second direct-current voltage to said cell continuously while said first voltage is applied and after it is suddenly changed, said second voltage having a magnitude and polarity so that the loss of the laser defined by the light power deflected out of said cavity to the light power approaching said polarizer becomes suddenly zero at the instant of time when it is desired to cause said laser to lase, thereby to substantially compensate for said strain-birefringent effect.

2. A laser as defined in claim 1 wherein said Pockels cell is provided with two electrodes, and wherein said first means applies said first voltage to one of said electrodes, while said third means applies said second voltage to the other one of said electrodes continuously during the time the Q of said cavity is lowered until after said laser lases.

3. A laser as defined in claim 2 wherein said Pockels cell consists of lithium niobate and wherein said second voltage is a positive voltage.

4. A laser as defined in claim 2 wherein said Pockels cell consists of potassium dideuterium phosphate and wherein said second voltage is a negative voltage.

* * * * *